United States Patent Office 3,393,197
Patented July 16, 1968

3,393,197
N-SUBSTITUTED-14-HYDROXYDIHYDRO-NORMORPHINES
Irwin J. Pachter, Woodbury, and Zaven Matossian, Jamaica, N.Y., assignors to Endo Laboratories Inc., Garden City, N.Y., a corporation of New York
No Drawing. Continuation-in-part of application Ser. No. 521,708, Jan. 19, 1966. This application Oct. 24, 1967, Ser. No. 677,727
7 Claims. (Cl. 260—285)

ABSTRACT OF THE DISCLOSURE

N-substituted-14-hydroxydihydronormorphines are disclosed which combine the properties of being narcotic antagonists as well as analgetics.

---

This application is a continuation-in-part of applicants' co-pending application Ser. No. 521,708, filed Jan. 19, 1966, now abandoned.

Field of the invention (1) The present invention relates to novel derivatives of morphine which do not possess the known, undesirable side effects of morphine, for example respiratory depression and the like, which have the general formula

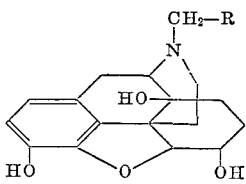

where R is an aliphatic group.

Description of the prior art (2) Heretofore many compounds have been prepared which have the normorphine nucleus, in particular derivatives having substituents on the nitrogen atom thereof. It has also been found that these compounds are not only narcotic antagonists but also have analgetic properties, have generally been accompanied by loss in potency, hallucinogenic side effects and respiratory depression.

The definition of narcotic antagonism adopted in the description of the present invention is that of Archer and Harris in their chapter on this topic in Progress in Drug Research, vol. 8, 1965, pages 261 through 320, wherein narcotic antagonists are defined as compounds which "have the remarkable property of reversing the major pharmacodynamic actions of the narcotics, the more potent ones being capable of inducing a withdrawal syndrome when given to narcotic addicts. Strictly speaking we consider a substance to be a narcotic antagonist if it can reverse the more prominent effects of morphine such as analgesia, sedation, respiratory depression and myosis."

In British Patent No. 939,287 there are disclosed N-substituted 14 - hydroxydihydronormorphinones. These compounds differ chemically from those of the present invention in that they have a keto group at the 6-position of the nucleus in contrast to the compounds of the present invention which carry a hydroxy group at that position. Furthermore, while these compounds are disclosed as possessing narcotic antagonist activity, there is nothing in the patent to suggest any analgetic activity of the disclosed compound.

In British Patents Nos. 975,601 and 975,102 there are disclosed N-substituted 14-hydroxydihydronorcodeines, that is to say compounds having a methoxy group at the 3-position in contrast to the compounds of the present invention which have a hydroxy group at that position. These codeine derivatives are disclosed as showing weak analgetic activity.

Furthermore, it is disclosed in these patents that in the codeine series there is a measure of equivalence of property between the 6 keto and the 6 hydroxy derivatives. However, this equivalence does not carry over into the normorphine series. In tests carried out to demonstrate the analgetic activity of the compounds of the present invention, it was shown that the 6-hydroxy compounds are more active than the corresponding 6-keto compounds by a factor of more than 25 to more than 400 depending upon the substituents at the N-position. These tests are summarized below.

Mice are injected with the analgetic to be tested, followed by the intraperitoneal injection of a solution of phenylquinone. The phenylquinone causes the animal to writhe in pain as indicated by stretching, twisting a hind leg inward, or contraction of the abdomen. The number of writhes for each animal was counted over a 30-minute interval and a control value determined from the average number of writhes produced by phenylquinone in animals to which the test compound had not previously been administered. Thirty or forty animals were used for each compound with ten animals on each dose level, the dose levels being selected in the range of 0.10 to 100 mg. of test compound per kg. of animal weight. The mice were injected subcutaneously with the test compound, and 15 minutes later, phenylquinone was injected intraperitoneally at a dose of 2.5 mg./kg. as a solution of 0.2 mg./ml. solution in 5% aqueous ethanol.

The calculation of analgetic activity was based on the percentage of animals at each dose level which showed only 50% or less of the average number of writhes compared to the average number of writhes of the control group to which saline and phenylquinone had been administered rather than the test compound and phenylquinone. The $ED_{50} \pm S.E.$ was then calculated by the method of Miller and Tainter (Proc. Soc. Expt. Biol. and Med. 57: 261, 1944).

The test method used has been widely employed in analgetic testing and has been shown to correlate well with the clinical analgetic potency of both narcotic and narcotic antagonist analgetics. (R. I. Taber, D. D. Greenhouse, and S. Irwin: Nature, 204: 190, 1964; H. Blumberg, P. S. Wolf, and H. B. Dayton: Proc. Soc. Expt. Biol. and Med., 118: 763, 1965; J. Pearl and L. S. Harris: J. Pharmacol. Expt. Therap., 154: 319, 1966.)

TABLE I.—ANALGETIC ACTIVITY IN MICE, S.C.

| Substitution | 6-Function | Dosage, mg./kg. | Analgesia | | |
|---|---|---|---|---|---|
| | | | No. An. | Percent | $ED_{50}\pm S.E.$, mg./kg. |
| N-allyl | Keto | 1.0 | 0/10 | 0 | >100 |
| | | 10 | 0/10 | 0 | |
| | | 50 | 0/10 | 0 | |
| | | 100 | 0/10 | 0 | |
| Do | Hydroxy | 2.5 | 1/10 | 10 | 4.0±0.7 |
| | | 5.0 | 6/10 | 60 | |
| | | 10 | 9/10 | 90 | |
| N-propynyl | Keto | 1.0 | 0/10 | 0 | >100 |
| | | 10 | 0/10 | 0 | |
| | | 100 | 0/10 | 0 | |
| Do | Hydroxy | 0.50 | 3/10 | 30 | 1.0±0.4 |
| | | 1.0 | 5/10 | 50 | |
| | | 2.0 | 7/10 | 70 | |
| N-clopropylmethyl | Keto | 0.10 | 0/10 | 0 | >100 |
| | | 1.0 | 0/10 | 0 | |
| | | 10 | 0/10 | 0 | |
| | | 100 | 0/10 | 0 | |
| Do | Hydroxy | 0.15 | 2/10 | 20 | 0.23±0.05 |
| | | 0.30 | 6/10 | 60 | |
| | | 0.60 | 8/10 | 80 | |

NOTE.—The word "Substitution" herein and in Tables 2 and 3 refer to the N-substituent group in the N-substituted-14-hydroxydihydronormorphines.

Thus, the compounds of the present invention clearly demonstrate a high level of analgetic activity in standard test animals.

Tests were also carried out to show that certain compounds within the scope of the present invention demonstrated narcotic antagonist activity in the counteraction of oxymorphone narcosis in rats and rabbits, as well as in mice. The potency of these compounds is demonstrated with respect to the known narcotic antagonist nalorphine. Narcotic antagonist activity is also demonstrated qualitatively and semi-quantitatively for other compounds within the scope of the present invention. These tests are summarized below.

Rats were injected subcutaneously with oxymorphone hydrochloride at 1 mg./kg., which produced narcosis and loss of righting reflex within 20 minutes. At 30 minutes after the oxymorphone injection, the narcotic antagonist was injected subcutaneously on the opposite side of the animal. If the rat regained its righting reflex within 10 minutes, it was considered counteraction. Three dosage levels, with 10 rats per level, were used for each drug. The test was described by H. Blumberg, P. S. Wolf and H. B. Dayton, Proc. Soc. Expt. Biol. and Med., 118, 63 (1965). The determination of the $ED_{50}\pm S.E.$ was made by the method of L. C. Miller and M. L. Tainter, Proc. Soc. Expt. Biol. and Med., 57, 261 (1944).

Detailed results of these experiments are given in the following Table 2, and show that N-cyclopropylmethyl-14-hydroxydihydronormorphine hydrochloride is about 1.6 times as potent as nalorphine hydrochloride, and N-cyclobutylmethyl-14-hydroxydihydronormorphine hydrochloride is about 0.4 times as potent as nalorphine hydrochloride.

TABLE 2.—NARCOTIC ANTAGONISM IN RATS, S.C.

| Substitution | Dosage, mg./kg. | Narcotic Antagonism | | | |
|---|---|---|---|---|---|
| | | No. An. | Percent | $ED_{50}\pm S.E.$, mg./kg. | Potency |
| N-cyclopropylmethyl-HCl | 0.25 | 1/10 | 10 | 0.58±0.14 | 1.6 |
| | 0.5 | 4/10 | 40 | | |
| | 1.0 | 8/10 | 80 | | |
| N-cyclobutylmethyl-HCl | 1 | 1/10 | 10 | 2.1±0.3 | 0.43 |
| | 2 | 4/10 | 40 | | |
| | 4 | 9/10 | 90 | | |
| Nalorphine-HCl | 0.4 | 2/10 | 20 | 0.90±0.22 | 1.0 |
| | 0.8 | 4/10 | 40 | | |
| | 1.6 | 8/10 | 80 | | |

In a related procedure in rabbits, the counteraction of narcotic-induced respiratory depression was used to demonstrate narcotic antagonism. Female New Zealand White rabbits were injected intravenously with oxymorphone hydrochloride at 2 mg./kg., which reduced the respiratory rate from the normal or pre-injection rate of about 280 per minute (range 180–400) to the depressed rate of about 44 per minute (range 12–88) at 30 minutes post-injection. The rabbits were then injected intravenously with the narcotic antagonists to determine the dose that produced complete counteraction of the respiratory depression in 50% of the animals ($ED_{50}$).

When N-cyclopropylmethyl-14-hydroxydihydronormorphine HCl was tested for narcotic counteraction by this method, with 12 rabbits used, the $ED_{50}$ was approximately 0.25 mg./kg., indicating that it was approximately twice as potent as nalorphine HCl. N-cyclobutylmethyl-14-hydroxydihydronormorphine HCl was tested similarly on 30 rabbits and gave an $ED_{50}$ of 2.3 mg./kg., indicating that it was approximately one-fourth as potent as nalorphine HCl.

TABLE 3.—NARCOTIC ANTAGONISM IN RABBITS, I.V.

| Substitution | Dosage, mg./kg. | Narcotic Antagonism | | | |
|---|---|---|---|---|---|
| | | No. An. | Percent | $ED_{50}\pm S.E.$, mg./kg. | Potency |
| N-cyclopropylmethyl-HCl | 0.125 | 1/4 | 25 | ca. 0.25 | 2.4 |
| | 0.25 | 2/4 | 50 | | |
| | 0.50 | 3/4 | 75 | | |
| N-cyclobutylmethyl-HCl | 1.0 | 1/10 | 10 | 2.3±0.4 | 0.26 |
| | 2.0 | 4/10 | 40 | | |
| | 4.0 | 8/10 | 80 | | |
| Nalorphine-HCl | 0.3 | 0/7 | 0 | ca. 0.60 | 1.0 |
| | 0.6 | 5/10 | 50 | | |
| | 1.2 | 3/4 | 75 | | |

In mice, narcotic antagonism was demonstrated by the prevention of the Straub tail effect. The Straub tail is the classical effect of narcosis in mice; the tail of the mouse is sustained in an erect, vertical position, raised at a 90° angle. This effect is consistently produced by the subcutaneous injection of oxymorphone hydrochloride at 2 mg./kg. When a narcotic antagonist is injected subcutaneously 15 minutes before the narcotic, the development of the Straub tail is prevented.

The mice are observed for 30 minutes after the injection of the narcotic antagonist. For purposes of quantitation the degree of tail erection is recorded at 5-minute intervals according to the following scale: 0-tail limp; 1-raised only horizontally; 2-raised at a 45° angle; 3-raised at a 90° angle, complete. A control group of 10 mice injected with the narcotic alone gives an average score of 3, or very close to it, for each mouse for the 6 readings in the 30-minute period. The $ED_{50} \pm S.E.$ of the narcotic antagonist is based upon the dosage which produces a 50% decrease in Straub tail score in 50% of the mice, as compared with the average score of the control group.

The narcotic antagonist potencies of N-cyclopropylmethyl-14-hydroxydihydronormorphine HCl and N-cyclobutylmethyl - 14 - hydroxydihydronormorphine HCl were worked out in quantitative detail and found to be 2.9 and 0.16 times, respectively, the potency of nalorphine HCl, as shown in Table 4. Narcotic antagonist potency was also demonstrated in the other 4 N-substituted 14-hydroxydihydronormorphines by qualitative or semi-quantitative tests, as shown also in Table 4.

14-hydroxydihydronormorphines having the general structural formula shown in FIGURE 1 below:

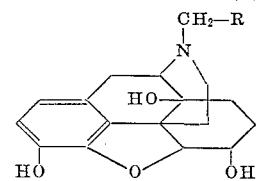

Fig. 1

These compounds may be conveniently prepared from 14-hydroxydihydronormorphinone by one of the two procedures shown in the reaction scheme of FIGURE 2.

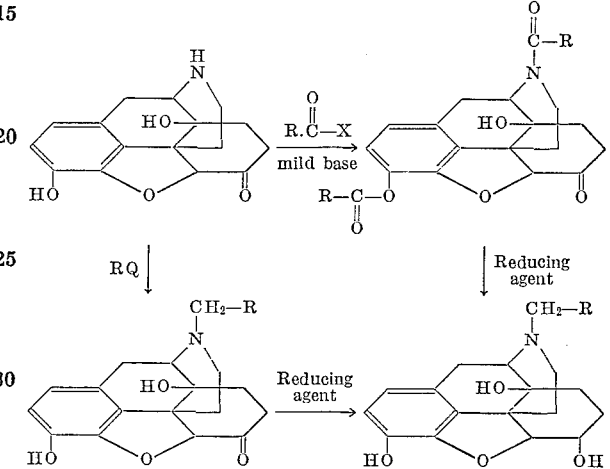

Fig. 2

TABLE 4.—NARCOTIC ANTAGONISM IN MICE, S.C.

| Compound | Dosage, mg./kg. | Narcotic Antagonism | | | |
|---|---|---|---|---|---|
| | | No. An. | Percent | $ED_{50}\pm S.E.$, mg./kg. | Potency |
| N-cyclopropylmethyl-HCl | 0.075<br>0.15<br>0.30 | 3/10<br>7/10<br>10/10 | 30<br>70<br>100 | 0.11±0.02 | 2.9 |
| N-cyclobutylmethyl-HCl | 1.2<br>2.4<br>4.8 | 1/10<br>7/10<br>10/10 | 10<br>70<br>100 | 2.0±0.2 | 0.16 |
| N-propyl-HCl | 10 | 3/3 | 100 | <10 | |
| N-allyl-HCl | 10 | 3/3 | 100 | <10 | |
| N-propynyl-HCl | 10 | 2/3 | 66 | <10 | |
| N-dimethylallyl-oxalate | 10 | 1/3 | 33 | | |
| Do | 40 | 3/3 | 100 | ca. 25 | |
| Nalorphine-HCl | 0.125<br>0.25<br>0.5<br>1.0<br>2.0 | 2/15<br>11/20<br>21/35<br>15/20<br>14/15 | 13<br>55<br>60<br>75<br>94 | 0.32±0.11 | 1.0 |

NOTE.—The term "Compound" in Table 4 above designates the N-substitution in the N-substituted-14-hydroxydihydronormorphines.

In order to obtain an indication of the utility of the compounds of the present invention with respect to primates, one of the compounds within the scope of the present invention, N-cyclobutyl-methyl-14-hydroxydihydronormorphine, was administered to monkeys. Two specific tests were carried out, and are summarized as follows. In the first test, a dose of 8 mgms. per kilogram of animal weight was administered to nonwithdrawn addicted monkeys. This administration caused intermediate to severe abstinence symptoms in the test animals.

In a second test, the compound was administered to addicted monkeys in a state of withdrawal, a dose of 2 mgms. per kilogram failed to suppress the abstinence symptoms shown by the test animals, and in similar tests at a level 4 and 8 mgms. per kilogram of animal body weight, exacerbation of abstinence symptoms was noted.

Summary of the invention

The present invention resides in certain N-substitutedwhere R is an aliphatic group, X is halo, and Q is halo or sulfate.

In one method of preparation the starting material is reacted with an alkylating agent or the like to place the substituent group upon the secondary amino in the molecule followed by reduction of the keto group. In the alternate route both the hydroxy group and the secondary amino group are acylated, followed by reduction of all the carbonyl functions. In this latter procedure the acyloxy group is reduced to the corresponding hydroxy group whereas the acylamino group is reduced to the corresponding alkylamine or the like as shown in the reaction scheme.

The compounds of this invention are useful as analgetics and are also useful not only in the detection of narcotic addiction, but also in counteracting the effects of narcotic over-dosage.

Preferred embodiments

In the preferred embodiments of the present invention, the substituent on the nitrogen of the 14-hydroxydihydronormorphine nucleus, designated R in FIGURE 1, may be alkyl, alkenyl, alkynyl, or cycloalkyl lower alkyl; especially preferred, however, are the compounds where $CH_2.R$ is propyl, allyl, methylallyl, dimethylallyl, propynyl, methylpropynyl, cyclopropylmethyl and cyclobutylmethyl.

The novel compounds of this invention are employed most effectively in the form of acid addition salts with pharmaceutically acceptable acids. Useful acids include inorganic acids such as hydrochloric, hydrobromic, sulfuric, nitric, phosphoric and perchloric as well as organic acids such as oxalic, tartaric, citric, acetic, succinic, maleic and ethanedisulfonic acid.

Compounds of Formula I or their aforedescribed addition salts may be put up in customary forms of pharmaceutical compositions compounded from the active substance and vehicular materials. Such pharmaceutical compositions comprise tablets, capsules, syrups, injectable solutions, suppositories and the like.

For analgetic action the dosages of the compounds are 0.5 to 50 mg. For counteraction of narcotic overdosage doses of 0.1 to 10 mg. are useful.

In the preferred synthesis procedure, dihydro-14-hydroxynormorphinone is heated with the requisite halo- or sulfato substituted aliphatic compound in a substantially basic medium, for example, allylbromide, di(methallyl)sulfate, propynylbromide, methylpropynylchloride, cyclopropylmethyl sulfate and the like. Preferred as solvents are compounds such as dimethylformamide and tertiary amines, for example, trialkylamines such as triethylamine. Upon completion of the reaction, the solvent is removed, and the N-substituted-14-hydroxydihydronormorphinone is reduced to the corresponding morphine.

This reaction may be carried out using any suitable reducing agent, preferred, however, is the use of sodium borohydride in ethanol or lithium aluminum hydride in tetrahydrofuran. The product is isolated from these reaction mixtures in the usual manner and recrystallized from suitable solvents, preferably from lower alkanols such as methanol. Where desired, the product of the reduction may be converted into an acid addition salt by any of the usual methods.

The following are examples in accordance with this invention, temperatures being set forth in degrees centigrade.

EXAMPLE 1.—N-ALLYL-14-HYDROXYDIHYDRONORMORPHINE

Method (a).—To 6.0 g. of N-allyl-14-hydroxydihydronormorphinone in 400 ml. of ethanol was added, in small portions, 0.7 g. of sodium borohydride. After the addition, the mixture was stirred for two hours and then concentrated. Water was added and the crystalline product thus obtained was recrystallized from methanol; M.P. 200–201°

Method (b).—A solution of 10.0 g. of N-allyl-14-hydroxydihydronormorphinone in 150 ml. of tetrahydrofuran was added over a thirty minute period to a suspension of 5 g. of lithium aluminum hydride in 600 ml. of tetrahydrofuran. The resulting mixture was stirred overnight. Excess hydride was destroyed by adding ethyl acetate and then water. The organic layer yielded the product which melted at 200–201° after recrystallization from methanol.

EXAMPLE 2.—N-DIMETHYLALLYL-14-HYDROXYDIHYDRONORMORPHINE BIOXALATE

A solution of 14.4 grams of dihydro-14-hydroxynormorphinone, 14.9 grams of 1-bromo-3-methyl-2-butene and 500 ml. of dimethylformamide was heated at 65° for 6 days. The solvent was removed under reduced pressure and the residue was dissolved in 270 ml. of water. The resulting solution was clarified with charcoal and adjusted to pH 9. There was obtained 11.9 grams of N-allyl - dimethylallyl - 14 - hydroxydihydronormorphinone, M.P. 248–9°. Upon recrystallization from chloroform and methanol, the M.P. was raised to 265.5°.

The N-dimethylallyl-14-hydroxydihydronormorphinone was reduced with lithium aluminum hydride as described in Example 1(b) followed by treatment with an acetone solution of oxalic acid. The bioxalate, upon recrystallization from acetone and methanol, melted at 179–180°.

EXAMPLE 3.—N-PROPYNYL-14-HYDROXYDIHYDRONORMORPHINE HYDROCHLORIDE

This compound was prepared from N-propynyl-14-hydroxydihydronormorphinone, M.P. 256–257°, by reduction with sodium borohydride as described in Example 1(a). The product was converted into its hydrochloride salt; M. P. 223–224°, upon recrystallization from methanol-acetone.

EXAMPLE 4.—N-CYCLOPROPYLMETHYL-14-HYDROXYDIHYDRONORMORPHINE

A solution of 14.4 gm. of dihydro-14-hydroxynormorphinone, 13.5 gm. of cyclopropylmethyl bromide and 550 ml. of dimethylformamide was heated at 70° for one week. The solvent was removed by distillation under reduced pressure (50–100 mm.) at a temperature not exceeding 70° and the residue was dissolved in water. The resulting solution was clarified with charcoal and adjusted with concentrated aqua amonia to pH 9. The product precipitated. Upon recrystallization from acetone, there was obtained 10.0 g. of N-cyclopropylmethyl-14-hydroxydihydronormorphinone M.P. 168–170°.

The N-cyclopropylmethyl-14-hydroxydihydronormorphinone was reduced with sodium borohydride as described in Example 1(a). The product melted at 217–218° upon recrystallization from methanol.

EXAMPLE 5.—N-CYCLOBUTYLMETHYL-14-HYDROXYDIHYDRONORMORPHINE

Method (a).—To a mixture of 83.8 g. of 14-hydroxydihydronormorphinone and 83.8 g. of cyclobutylcarbonyl chloride in two liters of methylene chlorine was added 101 g. of triethylamine. After addition of the amine, the mixture was heated under reflux for seven hours, cooled, extracted with water, dried and evaporated to dryness. The amorphous residue was dissolved in 650 ml. of tetrahydrofuran and added slowly to a suspension of 38 g. of lithium aluminum hydride in three liters of tetrahydrofuran. After stirring overnight, the excess hydride was destroyed with ethyl acetate. The resulting mixture was worked up in the usual manner to give 65.0 g. of product, M.P. 230.5°, from methanol-acetone.

Method (b).—A solution of 14.4 g. of 14-hydroxydihydronormorphinone, 15 g. of cyclobutylmethyl bromide and 500 ml. of dimethylformamide was heated at 70° for one week. The solvent was removed by distillation under reduced pressure (50–100 mm.) at a temperature not exceeding 70° and the residue was dissolved in water. The resulting solution was clarified with charcoal and adjusted to pH 9. N-cyclobutylmethyl-14-hydroxydihydronormorphinone precipitated and was purified by extraction with chloroform and recrystallized from ether M.P. 150–151° C.

The N - cyclobutylmethyl - 14-hydroxydihydronormorphinone was reduced with sodium borohydride in ethanol as described in Example 1(a); and a product was obtained which was identical with that prepared by Method (a) of this example.

EXAMPLE 6.—N-PROPYL-14-HYDROXYDIHYDRONORMORPHINE HYDROCHLORIDE

A 28.7 g. portion of 14-hydroxydihydronormorphinone was mixed with 15.0 g. of n-propyl bromide and 150 ml. of dimethylformamide and heated on a steam bath for five hours. The resulting solution was evaporated to dryness, diluted with 100 ml. of water, adjusted to pH 9.2 with concentrated aqua ammonia and extracted with chloroform. Some unchanged 14-hydroxydihydronormorphinone was insoluble and was removed at this point. The chloroform solution was concentrated and the residue crystallized from methanol-chloroform; M.P. ca. 151°. A portion of the base was further purified as the hydrochloride salt, M.P. 219–22° from methanol-acetone.

A 6.15 g. portion of the base, N-propyl-14-hydroxydihydronormorphinone, was reduced with 1.1 g. of sodium borohydride in ethanol by the method of Example 1(a). The resulting base melted at 234–236°. It was converted into the hydrochloride salt, M.P. 281–282°, upon recrystallization from methanol-acetone.

Examples of dosage forms of the compounds:

EXAMPLE 7.—ORAL FORM

| | Mg./tablet |
|---|---|
| Hydrochloride salt of N-cyclopropylmethyl-14-hydroxydihydronormorphine | 25 |
| Starch | 50 |
| Lactose | 75 |
| Magnesium stearate | 2 |
| Stearic acid | 5 |

The compound, a portion of the starch, and the lactose are combined and wet granulated with starch paste. The wet granulation is placed on trays and allowed to dry overnight at a temperature of 45°. The dried granulation is comminuted in a comminutor to a particle size of approximately 20 mesh. Magnesium stearate, stearic acid, and the balance of the starch are added and the entire mix blended prior to compression on a suitable tablet press. The tablets are compressed at a weight of 157 mg. using a 11/32″ punch with a hardness of 4 kg. These tablets will disintegrate within a half hour according to the method described in USP XVI.

EXAMPLE 8.—SUPPOSITORIES

| | Percent |
|---|---|
| Bioxalate salt of N-cyclobutylmethyl-14-hydroxydihydronormorphine | 0.17 |
| Polyoxyethylene 1000 (approx. M.W. 1000) | 80.14 |
| Polyoxyethylene 4000 (approx. M.W. 4000) | 15.00 |
| Methylparaben | .15 |
| Propylparaben | .05 |
| Purified water USP | 4.49 |

The bioxalate salt of the compound is dissolved in the water and added to a melted mixture of the polyoxyethylenes which already were combined with the parabens. This molten mixture is poured into suppository molds and cast into suppositories weighing 3 grams each. They are frozen to solidify and packaged into foil. These suppositories liquefy in the rectal area to a combination of body heat and moisture, and thus releasing the active substance which is rapidly absorbed. This provides a concentration of 5 mg./suppository.

EXAMPLE 9.—PARENTERAL FORM

| | Mg./cc. |
|---|---|
| Hydrochloride salt of N-dimethylallyl-14-hydroxydihydronormorphine | 0.5 |
| Sodium chloride | 9.0 |
| Methylparaben | 1.8 |
| Propylparaben | 0.2 |
| Water for injection, q.s. | |

The solution is prepared by first dissolving the parabens in hot water suitable for injection use, cooling to room temperature and dissolving the compound and sodium chloride. It it then filtered, using sterile technique, through a bacteriological filter (0.6 micron or smaller porosity), after which it is filled into ampoules or multiple-dose vials with the equipment commonly used in the pharmaceutical industry.

It will be understood that the foregoing description of the invention and the examples set forth are merely illustrative of the principles thereof. Accordingly, the appended claims are to be construed as defining the invention within the full spirit and scope thereof.

We claim:
1. A compound of the group consisting (1) a compound of the following Formula I,

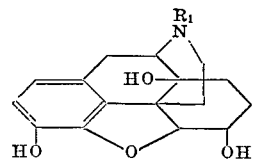

(Formula I)

and (2) the addition salts thereof with a pharmaceutically acceptable acid wherein: $R_1$ is allyl, methylallyl, dimethylallyl, propynyl, methylpropynyl, cyclopropylmethyl, cyclobutylmethyl or propyl.

2. The invention defined in claim 1 wherein the compound of Formula I, is N-cyclopropylmethyl-14-hydroxydihydronormorphine.

3. The invention defined in claim 1 wherein the compound of Formula I, is N-cyclobutylmethyl-14-hydroxydihydronormorphine.

4. The invention defined in claim 1 wherein the compound of Formula I, is N-allyl-14-hydroxydihydronormorphine.

5. The invention defined in claim 1 wherein the compound of Formula I, is N-(3,3-dimethylallyl)-14-hydroxydihydronormorphine.

6. The invention defined in claim 1 wherein the compound of Formula I, is N-propynyl-14-hydroxydihydronormorphine.

7. The invention defined in claim 1 wherein the compound of Formula I, is N-propyl-14-hydroxydihydronormorphine.

References Cited

UNITED STATES PATENTS 3,320,262  5/1967  Lewenstein _____ 260—285

OTHER REFERENCES

Iway: Japanese Patent 22,189 (October 1965), abstracted in Chem. Abstr., vol 64, col. 3626g.

NICHOLAS S. RIZZO, Primary Examiner.

D. DAUS, Assistant Examiner.